(12) United States Patent
Carnevali

(10) Patent No.: US 8,322,768 B2
(45) Date of Patent: Dec. 4, 2012

(54) VARIABLE LENGTH VEHICLE CONSOLE

(76) Inventor: Jeffrey D. Carnevali, Seattle, WA (US)

( * ) Notice: Subject to any disclaimer, the term of this patent is extended or adjusted under 35 U.S.C. 154(b) by 579 days.

(21) Appl. No.: 12/387,785

(22) Filed: May 7, 2009

(65) Prior Publication Data

US 2010/0283277 A1 Nov. 11, 2010

(51) Int. Cl.
*B60R 7/04* (2006.01)
(52) U.S. Cl. ................... 296/24.34; 296/193.04
(58) Field of Classification Search ............... 296/24.34, 296/193.04, 37.8; 312/205
See application file for complete search history.

(56) References Cited

U.S. PATENT DOCUMENTS

| | | | | |
|---|---|---|---|---|
| 4,818,010 A | * | 4/1989 | Dillon | 296/37.7 |
| 5,259,655 A | * | 11/1993 | Anderson | 296/70 |
| 6,428,072 B1 | * | 8/2002 | Moore | 296/24.34 |
| 7,029,048 B1 | * | 4/2006 | Hicks et al. | 296/24.34 |
| 7,140,675 B2 | * | 11/2006 | Tiesler | 296/214 |
| 2006/0113811 A1 | * | 6/2006 | Tanaka et al. | 296/24.34 |
| 2007/0069541 A1 | * | 3/2007 | Sturt et al. | 296/24.34 |
| 2010/0090489 A1 | * | 4/2010 | Carnevali | 296/24.34 |
| 2010/0090492 A1 | * | 4/2010 | Carnevali | 296/37.8 |
| 2010/0283281 A1 | * | 11/2010 | Carnevali | 296/37.8 |

* cited by examiner

*Primary Examiner* — Jason S Morrow
(74) *Attorney, Agent, or Firm* — Charles J. Rupnick

(57) ABSTRACT

A vehicle console having side panels that can be shortened to different lengths for shortening the console. Molded side rails are optionally fitted to upper connection portions of the side panels and can be shortened to match the different shorter lengths of the side panels. A plurality of face plates are provided for mounting equipment on the console.

21 Claims, 11 Drawing Sheets

VARIABLE LENGTH VEHICLE CONSOLE

FIELD OF THE INVENTION

The present invention relates to vehicle consoles being mountable within a vehicle driver compartment to support equipment in a location easily accessible to a driver of the vehicle, and in particular to such a vehicle console having molded side rails that are fitted to upper connection portions of rigid side panels of the console.

BACKGROUND OF THE INVENTION

Police officers, public safety officers, firefighters, paramedics and the like carry various types of equipment in their vehicles. Several pieces of equipment are often carried in a single vehicle, and the driver often needs to operate the equipment while simultaneously driving the vehicle. Thus, various devices exist to secure multiple pieces of equipment within a vehicle so that they are accessible to the driver and/or other persons in the vehicle driver compartment.

These devices commonly include a hollow rectangular box situated on the floor of the vehicle between the driver seat and front passenger seat, including a horizontal top portion having an upwardly facing opening for receiving pieces of equipment. Police cruisers, for example, are commonly fitted with equipment boxes of this type. The boxes are used to house various types of equipment and controls used by police officers, such as radios, siren controls and light bar controls. Typically, the boxes are sized and positioned so that most of the box extends between the driver seat and the front seat. Only a small portion, if any, of the box will extend forward toward the dashboard beyond the driver seat and front passenger seat. In some police cruisers, the equipment box extends all the way back to the prisoner partition separating the rear seating area from the driver compartment. A laptop computer is often positioned between the box and dashboard, and is secured to the vehicle floor with various types of mounting hardware.

Systems employing the conventional equipment box described above suffer from a number of problems associated with the structure of the box. The box includes machined side and end panels, typically of steel or an aluminum alloy. Well known limitations of metal working require the metal end panels of the prior art to have square and sharp edges and corners that, even when broken, remain uncomfortable and even dangerous to the vehicle driver and passengers. Even when manufactured of bent sheet metal, consoles of the prior art have relied on square corners and edges without significant rounding or beveling.

The conventional equipment box configuration described above thus fails to provide safe corner and edge configurations, and the vehicle occupants are discomforted and even endangered.

Furthermore, consoles of the prior art are manufactured in fixed lengths so that changing the console's length requires replacement with an entire new console.

SUMMARY OF THE INVENTION

The present invention is a novel variable length vehicle console having side panels that can be shortened to different lengths for shortening the console. A plurality of face plates are provided for mounting equipment on the console.

According to one aspect of the novel vehicle console, the console includes a pair of end panels and a pair of side panels that are interconnectable with the pair of end panels, each of the side panels further having at least one removable portion for reducing a length thereof to a reduced length. A plurality of face plates each have portions thereof that are interconnectable with a respective one of the pair of side panels. A plurality of connectors are operable for securing each of the face plates to a respective portion of each of the side panels.

According to another aspect of the novel vehicle console, each of the side panels further includes a sizing element between a base portion thereof and the removable portion.

According to another aspect of the novel vehicle console, the sizing element is a stress riser. Furthermore, the stress riser is optionally a stress riser selected from the group of stress risers including but not limited to: a scoring, a groove, a cut, a notch, and a slot.

According to another aspect of the novel vehicle console, each of the base portion of each of the side panels and the removable portions thereof further includes one or more connection points positioned to cooperate with connection points on the pair of end panels. Furthermore, each of the side panels further includes a plurality of the removable portions for reducing a length thereof to a plurality of the reduced lengths, and each of the plurality of the removable portions further includes one or more of the connection points positioned to cooperate with the connection points on the pair of end panels. Each of the base portions of the side panels and each of the plurality of the removable portions thereof further includes a connection portion structured for having the interconnectable portions of the face plates interconnected therewith.

According to another aspect of the novel vehicle console, a method is provided configuring a variable length vehicle console having shortenable side panels, as detailed herein.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
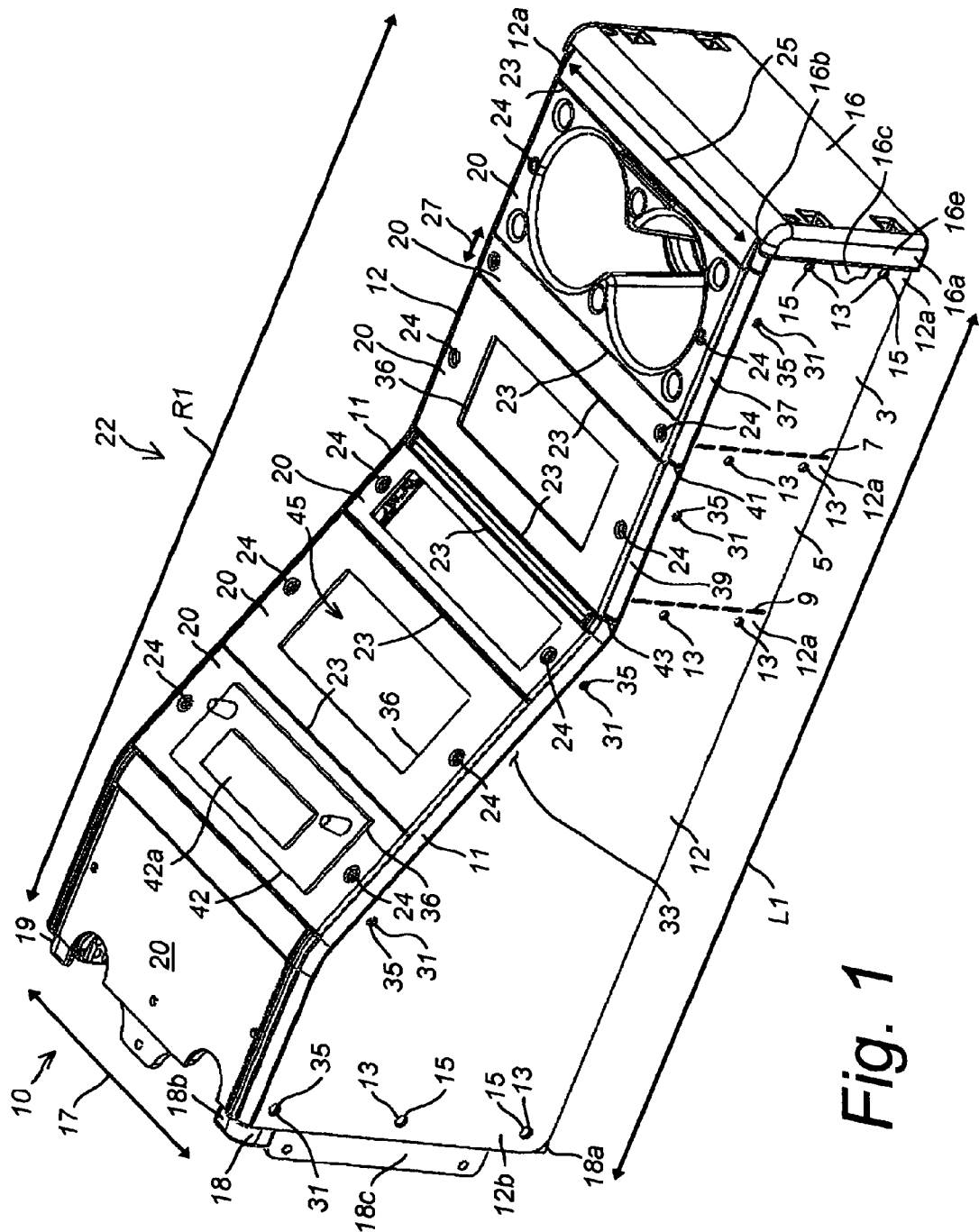
FIG. 1 is a perspective view showing an example of the novel vehicle console.

FIG. 1 is a perspective view that illustrates a novel reconfigurable vehicle console 10 having a pair of opposing substantially rigid side panels 12 and opposing substantially rigid end panels 16 and 18. End panels 16, 18 are formed with opposing side edge mounting surfaces 16c and 18c, respectively, shown in partial break away of side panels 12. Edge mounting surfaces 16c, 18c of the end panels 16, 18 are substantially rigidly interconnected between end connection portions 12a and 12b, respectively, of side panels 12. Optionally, side edge mounting surfaces 16c, 18c are relieved by about the thickness of side panels 12 such that end connection portions 12a, 12b of respective side panels 12 are approximately flush mounted with portions 16e and 18e of respective end panels 16 and 18 exposed by side panels 12.

First end connection portions 12a of side panels 12 extend substantially from a base 16a of first end panel 16 to its crown 16b. Second end connection portions 12b of side panels 12 extend substantially from a base 18a of second end panel 18 to its crown 18b. End connection portions 12a, 12b of two side panels 12 and opposing edges of the first and second end panels 16, 18 are each formed with one or more cooperating connection points 13. By example and without limitation, end connection portions 12a, 12b of side panels 12 connect with opposing edges of end panels 16, 18 at connection points 13 by means of connectors 15. Connectors 15 are, for example, threaded fasteners or other removable and interchangeable connectors. Cooperating connection points 13 are formed in substantially identical positions on both end connection portions 12a, 12b of side panels 12 and opposing edges of respective end panels 16, 18. Side panels 12 thus have a plurality of cooperating connection points 13 and with respective end panels 16, 18. More or fewer connection points 13 are also contemplated and may be included or substituted without deviating from the scope and intent of the present invention.

The spacing between opposing side edge mounting surfaces 16c and 18c of end panels 16 and 18, respectively, are substantially the same width such that side panels 12 are spaced apart a substantially uniform or constant distance 17 between end panels 16, 18, thereby forming a substantially rectangular support frame 19.

Furthermore, it is generally well known that consoles of the prior art are manufactured in fixed lengths so that changing the console's length requires buying a whole new console. The method disclosed herein permits any of the original console manufacturer, the distributor, the wholesaler, retailer, installer or end user to change the console 10 to any of several lengths. Accordingly, the novel console 10 is convertible to different lengths as illustrated in the figures.

Side panels 12 are manufactured in pairs with the pairs having different lengths L that are optionally reconfigured to any desired length L1, L2, L3 through Ln. As illustrated herein, all side panels 12 have an original maximum length L1 that includes one, two or more shorter lengths L2, L3 through Ln. Here, each side panel 12 includes at least two removable portions 3 and 5 that are removable for shortening the side panels 12 from original maximum length L1 down to two or more shorter lengths L2, L3 through Ln. Therefore, as shown here each side panel 12 includes at least two sizing elements 7 and 9 that at least provide an indication of where side panels 12 can be cut or broken down to one of the other lengths L2, L3 . . . Ln shorter than original maximum length L1. Sizing elements 7, 9 are, for example, indicator lines that show where to cut or break side panels 12 to result in of one of the shorter lengths L2 or L3. Alternatively, sizing elements 7, 9 are stress risers that ease breaking of side panels 12 at one of respective removable portions 3, 5. For example, sizing elements 7, 9 are scorings in one or both surfaces of the side panels 12. Sizing elements 7, 9 may be a series of grooves, cuts, notches or slots that weaken the side panels 12 at each of the respective removable portions 3, 5. When sizing elements 7, 9 are embodied as stress risers, repetitive bending results in fatigue that causes side panels 12 to break at one of the shorter lengths L2 or L3 for removal of respective removable portions 3, 5.

Resultant shorter side panels 12 each have the same first heights for their first end connection portions 12a. Base side panel 12 and of each removable portion 3, 5 all include end connection portions 12a having connection points 13 at substantially identical positions that match with first end panel 16 for receiving connectors 15. Therefore, first end connection portions 12a of side panels 12 of any original length L1 or shorter length L2, L3 connect with recessed edges 16c of first end panel 16 at substantially identical connection points 13 using either the same or identical connectors 15. Accordingly, regardless of length any pair of side panels 12 of the same length L1, L2, L3 . . . Ln may be interconnected between end panels 16, 18. Thus, by simply shortening the pair of side panels 12, the novel console 10 can shortened to fit different needs or different vehicles. In the prior art, the user could only change the length of a console by buying an entire new different console. Now, by providing pairs of shortenable side panels 12, the present invention makes it possible to shorten the overall console 10 without buying a whole new console. Novel console 10 is a truly modular console system that can be reconfigured for use in different vehicles by just shortening side panels 12, or just reconfigured for use in the same vehicle to accommodate fewer pieces of equipment or other utilities.

Figure 2:
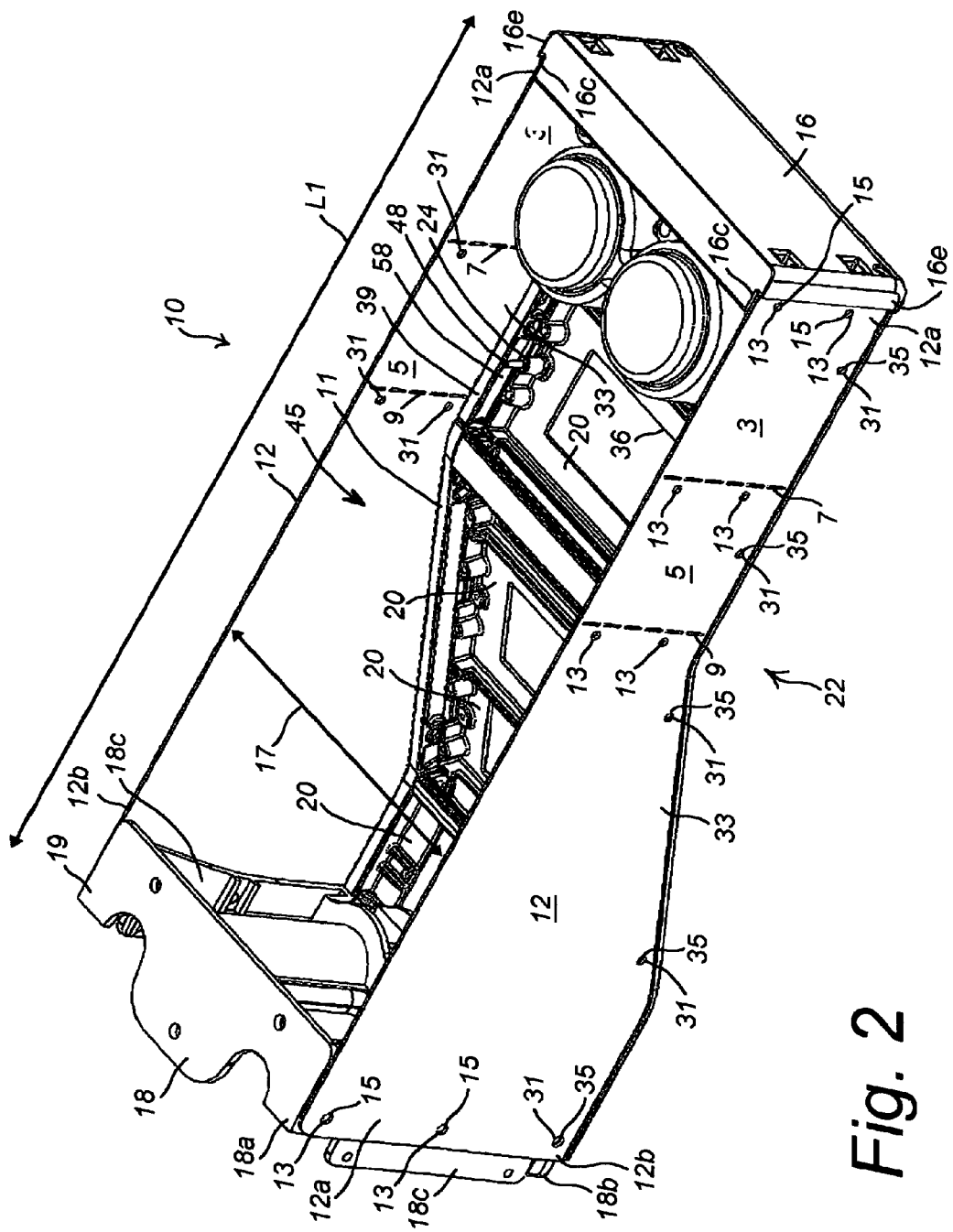
FIG. 2 is a is a perspective view into an interior portion of the novel vehicle console.

Furthermore, as illustrated here and more clearly in FIG. 2, recessed edges 16c of the first end panel 16 are optionally reentrant for receiving the edge of connection portions 12a of side panels 12 left cut or jagged by cutting or breaking at sizing elements 7, 9 for removal of respective removable portions 3, 5.

A pair of molded side rails 11 are interconnectable adjacent to upper edge surfaces of respective side panels 12 between end panels 16, 18. For ease of manufacture, side rails 11 consist of a molded material, such as plastic, nylon or composite material. For example, a plurality of cooperating connection points 31 are provided between side panel connection portions 32 of each side rail 11 and upper connection portions 33 of respective side panel 12. By example and without limitation, side rails 11 connect with upper portions 33 of side panels 12 at connection points 31 by means of connectors 35. Connectors 35 are, for example, threaded fasteners or other removable and interchangeable connectors.

Side rails 11 are molded with an original maximum length R1 that corresponds to original length L1 of side panels 12. Furthermore, side rails 11 are molded with at least two removable portions 37 and 39 that can be removed for shortening of side rails 11 from the original maximum length R1 down to two or more shorter lengths R2, R3 through Rn that correspond to shorter lengths L2, L3 . . . Ln of side panels 12 when one or two removable portion 3, 5 are removed. Shortenable side rails 11 are also molded with sizing elements 41 and 43 that correspond to sizing elements 7, 9 of side panels 12 For example, sizing elements 41, 43 at least provide an indication of where the two side rails 11 can be cut or broken down to one of the other shorter than original maximum length R1. Sizing elements 41, 43 are, for example, indicator lines that show where to cut or break to result in side rails 11 of one of the shorter lengths R2 or R3. Alternatively, sizing elements 41, 43 are stress risers that ease breaking of side rails 11 at one of the shorter lengths R2 or R3. For example, sizing elements 41, 43 are scorings in the surface of side rails 11 that ease snapping at locations that correspond to sizing elements 7, 9 of side panels 12. Sizing elements 41, 43 may be a series of grooves, cuts, notches or slots that reduce or neck-down the cross-sectional area and weaken the side rails 11 at each of the shorter lengths R2 or R3. Alternatively, repetitive bending at stress riser sizing elements 41, 43 results in fatigue that causes the side rails 11 to break at one of the shorter lengths R2 or R3 for removal of respective removable portions 37, 39.

A plurality of substantially interchangeable face plates 20 are removably clamped to side rails 11 at the tops of side panels 12 of the rectangular support frame 19 between the opposing end panels 16, 18. For example, a plurality of the interchangeable face plates 20 are removably clamped between the side rails 11 on side panels 12. When installed on side rails 11, the face plates 20 partially form a top or upwardly facing surface 22 of the console 10. One or more pair of releasable connectors 24, such as fasteners or releasable clamps, secures each of the face plates 20 to each of the side rails 11. More or fewer of the face plates 20 are utilized depending upon the different optional lengths L of the console 10.

The face plates 20 are all of a substantially uniform length 25 between the side rails 11, but are optionally formed with any useful width between the end panels 16, 18. However, the face plates 20 are optionally of a minimum unit width 27 or an integral multiple of the minimum unit width 27. By example and without limitation, the all of the face plates 20 are either a minimum width 27 of about 1 inch, for example, or an integer multiple of the minimum 1 inch width 27, i.e., 2 inch, 3 inch, 4 inch, etc.

A modern surface mount equipment piece 42, such as a radio, global positioning sensor (GPS), is optionally surface-mounted directly on the outer surface 21 of one of the face plates 20, as by adhesive or mechanical fasteners. Optionally, one or more cutouts 36 are formed in different face plates 20 for receiving there through the equipment piece 42, such as a radio, global positioning sensor (GPS), or siren and light bar controls, that is not of the surface-mount variety, or other control switches. When present, the cutouts 36 are either sized to industry standards for a particular equipment piece 42, else custom sized to match a particular make and model of equipment piece 42. The face plate 20 thus functions as a face plate for the equipment piece 42 being secured thereto, with the cutout 36 functioning as a bezel surrounding an operating face 42a of the equipment piece 42. The cutouts 36 for receiving an equipment piece 42 is substantially the only significant difference between blank face plates 20 and face plates 20 for mounting an equipment piece 42.

Joints 23 are formed between adjacent face plates 20, and additional joints 23 are formed between end ones of the face plates 20 and respective adjacent end panels 16, 18. In contrast to the butt joints typical in prior art consoles, joints 23 are optionally overlapping which causes them to be distinctly more sealed and secure than such butt joints of the prior art. For example, overlapping joints 23 are either lap joints or tongue-and-groove joints.

FIG. 2 is a view into an interior portion 45 of novel reconfigurable vehicle console 10 viewed from the underside opposite from top or upwardly facing surface 22. Side edge mounting surfaces 16c, 18c of respective end panels 16, 18 are more clearly illustrated here as being optionally relieved or recessed by about the thickness of side panels 12. Relieved side edge mounting surfaces 16c, 18c permit first and second end connection portions 12a, 12b of respective side panels 12 to lay substantially flush with portions 16e, 18e of respective end panels 16, 18 exposed by side panels 12. As disclosed herein, first and second end connection portions 12a, 12b of respective side panels 12 connect with the opposing mounting edges 16c, 18c of first and second end panels 16, 18 at connection points 13 by means of connectors 15.

Furthermore, recessed edges 16c of the first end panel 16 are shown as being optionally reentrant for receiving the edge of connection portions 12a of side panels 12 left cut or jagged by cutting or breaking at sizing elements 7, 9 for removal of respective removable portions 3, 5.

Face plates 20 are secured to mounting lips 58 of the side rails 11 by one or more pair of the releasable connectors 24. Connectors 24 are illustrated here as releasable clamps having a movable jaw portion 48 for engaging or disengaging mounting lips 58 of side rails 11 at upper portions 33 of side panel pairs 12.

Figure 3:
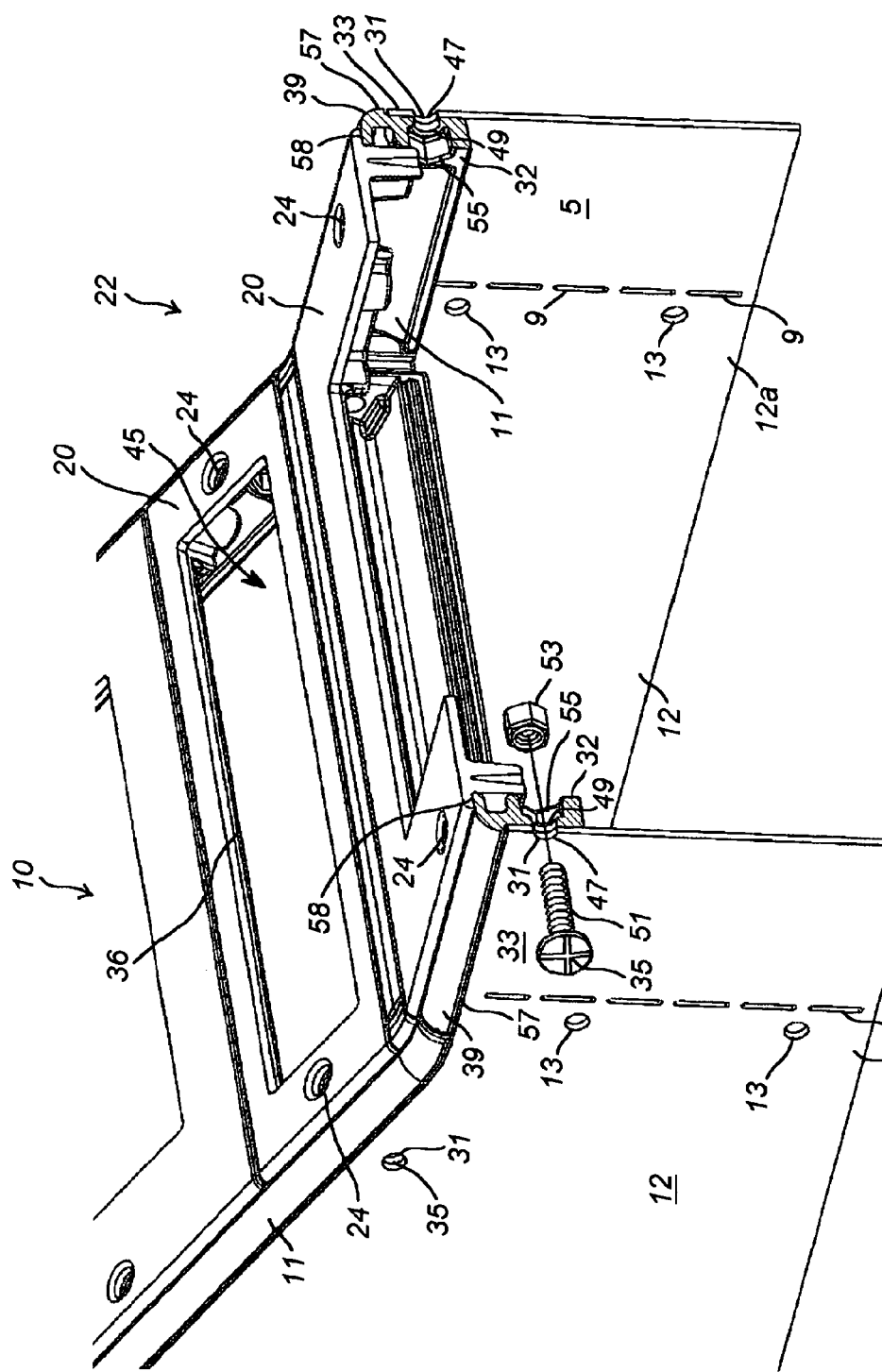
FIG. 3 is a cross-section view showing cooperating connection points between side rails and upper portions of respective side panels of the novel vehicle console.

FIG. 3 illustrates one example of cooperating connection points 31 between side rails 11 and upper portions 33 of respective side panel 12 being embodied as fastener apertures 47 through upper portions 33 of respective side panel 12 and mutually aligned fastener apertures 49 through connection portions 32 of side rails 11. Accordingly, fasteners 51 are coupled through fastener apertures 47, 49 between the side rails 11 and respective side panel 12. According to one embodiment, fasteners 51 are threaded fasteners and apertures 47 are clearance holes through upper portions 33 of side panel 12. Fastener apertures 49 are mating threaded holes through side rails 11. Else, fastener apertures 49 are clearance holes through connection portions 32 of side rails 11 and are mated with threaded nuts 53 within interior portion 45 of console 10. According to one embodiment, fastener clearance apertures 49 also include nut pockets 55 molded into connection portions 32 of side rails 11 opposite from the side panels 12 and matched to nuts 53. Nut pockets 55 permit joining of side rails 11 to side panels 12 without requiring manual access to console interior portion 45.

FIG. 3 also illustrates connection portions 32 of side rails 11 being optionally relieved or recessed by about the thickness of the side panels 12 such that upper portions 33 of respective side panels 12 are approximately flush mounted with overhanging lip portions 57 of respective side rails 11 exposed above side panels 12. Lip portions 57 overhang and cover respective upper portions 33 and protect the user from sharp edges of side panels 12.

Figure 4:
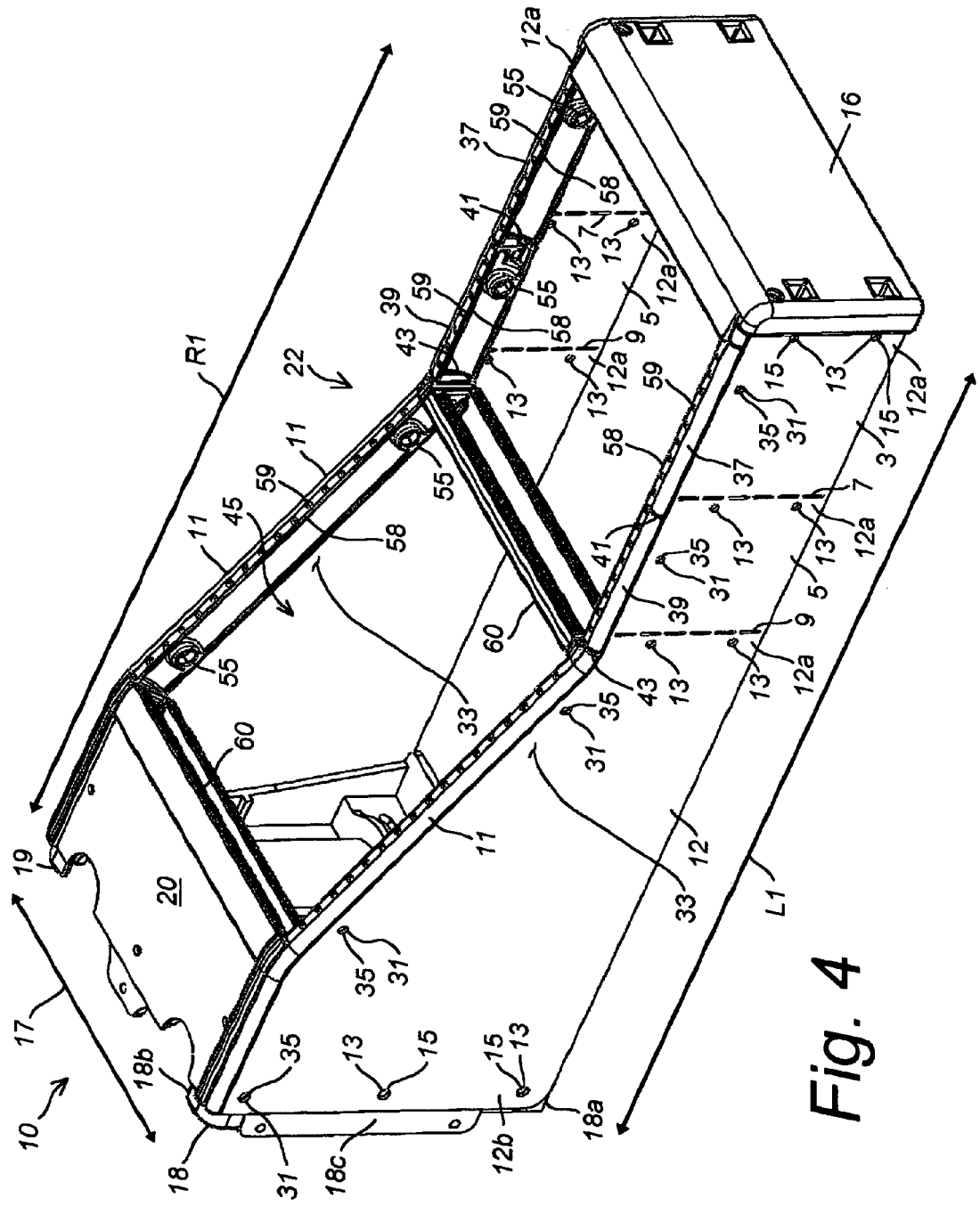
FIG. 4 illustrates the of the novel vehicle console having its face plates removed.

FIG. 4 shows the console 10 having face plates 20 removed. Side rails 11 are illustrated as being mounted on the upper portions 33 of side panel pairs 12. Mounting lips 58 of side rails 11 are presented facing the upper surface 22 of the console 10 for receiving face plates 20. By example and without limitation, mounting lips 58 are structured with a plurality of apertures 59 spaced along side rails 11 at substantially uniform intervals. Face plates 20 are secured to mounting lips 58 of side rails 11 by pairs of releasable connectors 24 coupled to apertures 59.

Molded unions 60 are positioned between portions of side rails 11 at angle changes along upper portions 33 of side panel pairs 12. Unions 60 are optionally interconnectable to the panel upper portions 33 for fixing the substantially uniform spacing 17 between side pairs 12. For ease of manufacture, unions 60 consist of a molded material, such as plastic, nylon or composite material.

Figure 5:
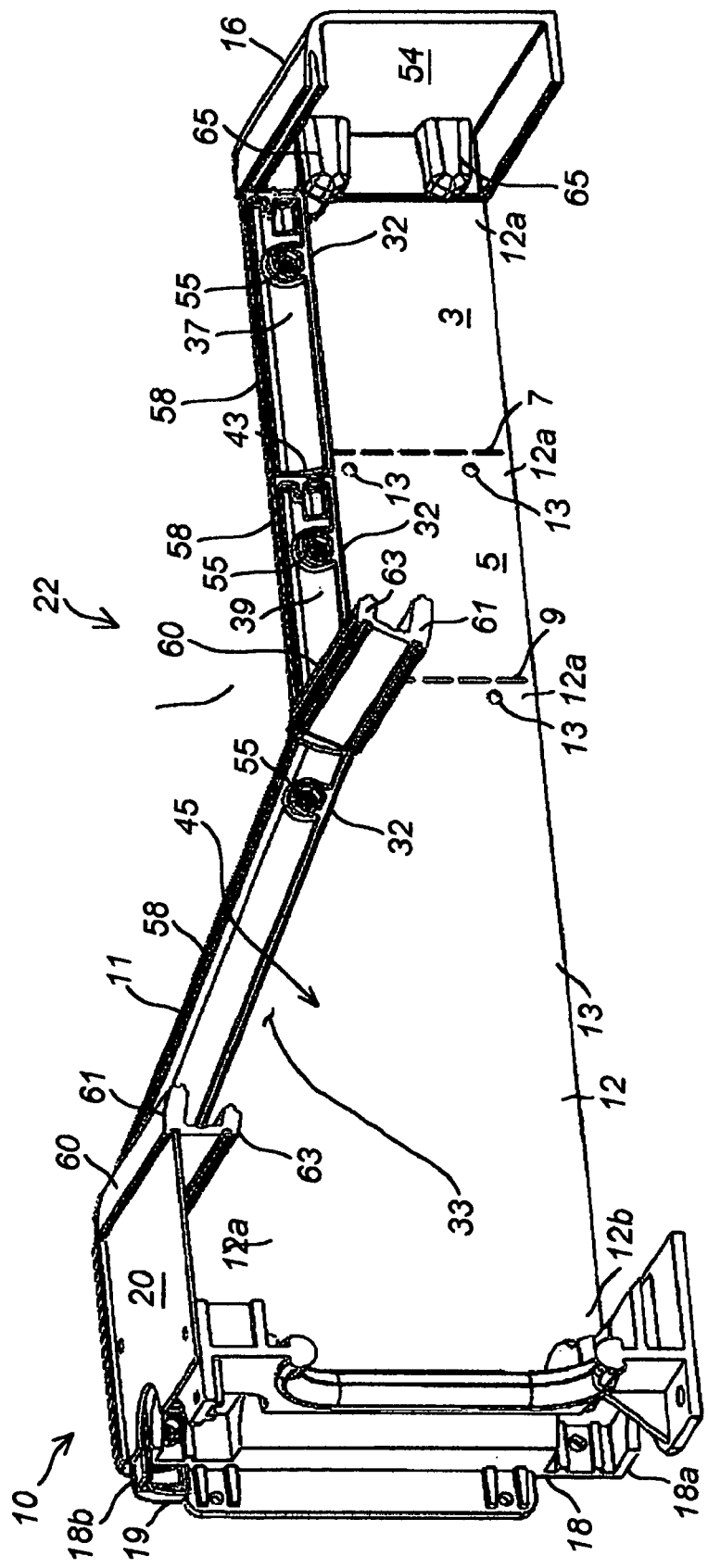
FIG. 5 is a cross-section taken lengthwise through the novel vehicle console.

FIG. 5 is a cross-section taken lengthwise through console 10. Here, unions 60 are illustrated as being reversible for fitting either acute or obtuse angles. Unions 60 are a truncated triangle having a wide base portion 61 for use with obtuse angles of upper portions 33 of side panel pairs 12, and an opposite truncated portion 63 at the pointed end for use with acute angles.

Figure 6:
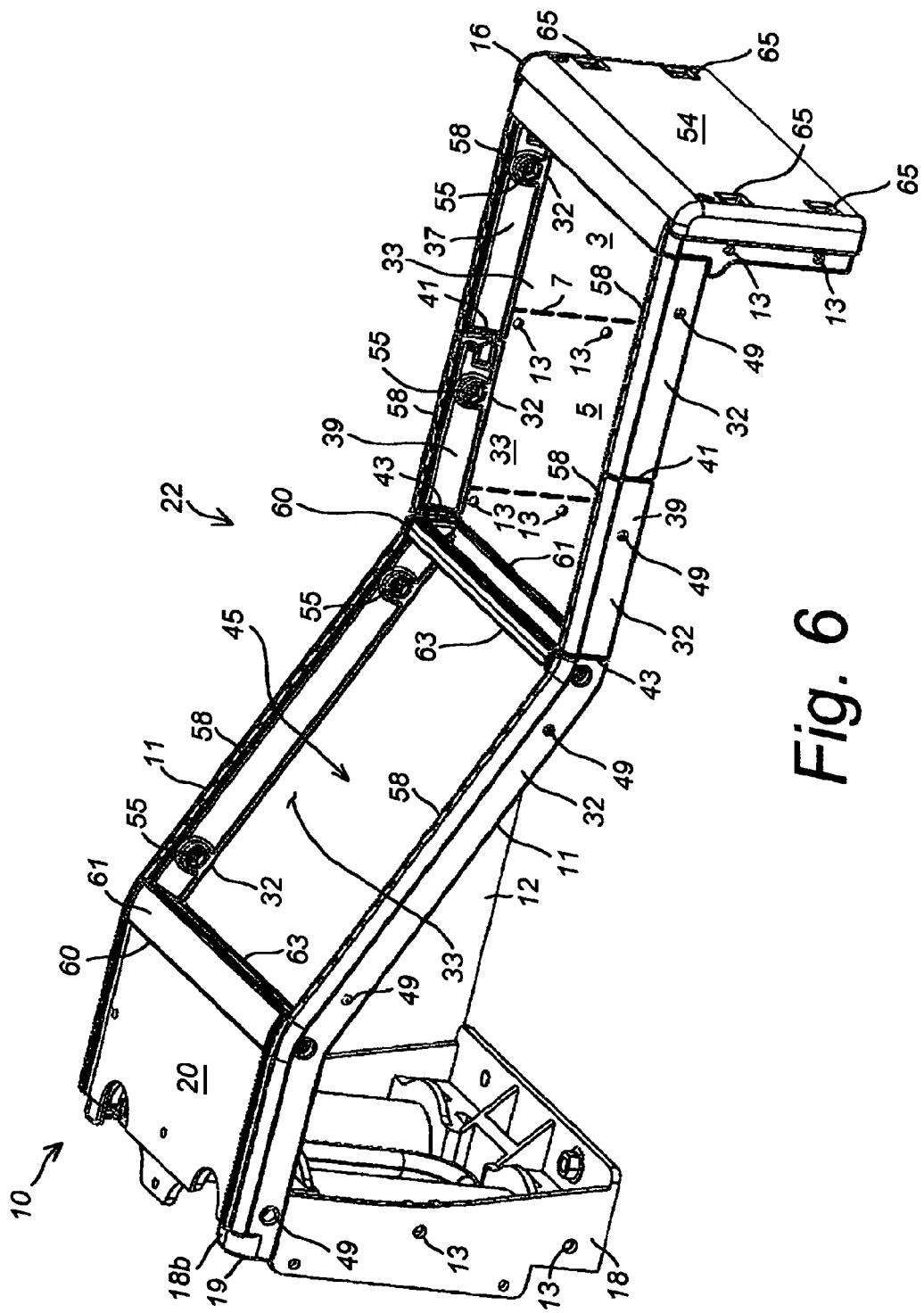
FIG. 6 shows the novel console having one side panel and face plates removed.

Also shown here is a plurality of side nut pockets 65 formed in end panel 16. Side nut pockets 65 hold nuts for engagement by threaded connectors 15 for securing end connection portions 12a of side panels 12. As shown in FIG. 6, nut pockets 65 may be accessed through an outer face 54 of end panel 16.

FIG. 6 shows the console 10 having face plates 20 removed. One side panel 12 is removed exposing connection portions 32 of side rails 11, as well as mounting edge surfaces 16c of end panel 16. Exposed connection portions 32 of side rails 11 are shown having fastener apertures 49 with molded nut pockets 55 for attachment of side panel 12. Also, sizing elements 41, 43 are shown as necked-down stress risers that extend completely around each side rail 11 at respective removable portions 37, 39.

Connection points 13 are shown in mounting edge surfaces 16c of end panel 16 for side panel 12.

Cooperating connection points 67 are provided between end connection portions 69 of each side rail 11 and each end panel 16, 18. By example and without limitation, cooperating connection points 67 are embodied as fastener apertures 71 through end panel 16 and mutually aligned fastener apertures 73 through end connection portions 69 of side rails 11. Fasteners 75 are coupled through the fastener apertures 71, 73 to fix end panel 16 to side rails 11. According to one embodiment, fasteners 75 are threaded fasteners, and apertures 71 are clearance holes through end panel 16. Fastener apertures 73 are optionally mating threaded holes in end connection portions 69 of side rails 11. Else, fastener apertures 73 are clearance holes through end connection portions 69 of side rails 11 and are mated with threaded nuts 77 within interior portion 45 of console 10. According to one embodiment of the, fastener clearance apertures 73 also include at least partial nut pockets 79 molded into end connection portions 69 of side rails 11 and matched to nuts 77. Partial nut pockets 79 permit joining of end panel 16 to side rails 11 without requiring manual access to interior portion 45 of console 10.

Furthermore, end connection portions 69 having cooperating connection points 67 are molded into each base side rail 11 and each removable portion 37, 39 of each of side rail 11. For example, side panels 12 are shown here with outer removal portions 3 being removed at outer sizing element 7, whereby side panels 12 are shortened from maximum length L1 to intermediate length L2. Side rails 11 are shown here with outer removable portions 37 being removed at outer sizing element 41, whereby side rails 11 are shortened from maximum length R1 to intermediate length R2. Fasteners 75 are used to interconnect end panel 16 to end connection portions 69 of inner removable portion 39 of shortened side rails 11 by threaded connection to nuts 77 in molded nut pockets 79.

Figure 7:
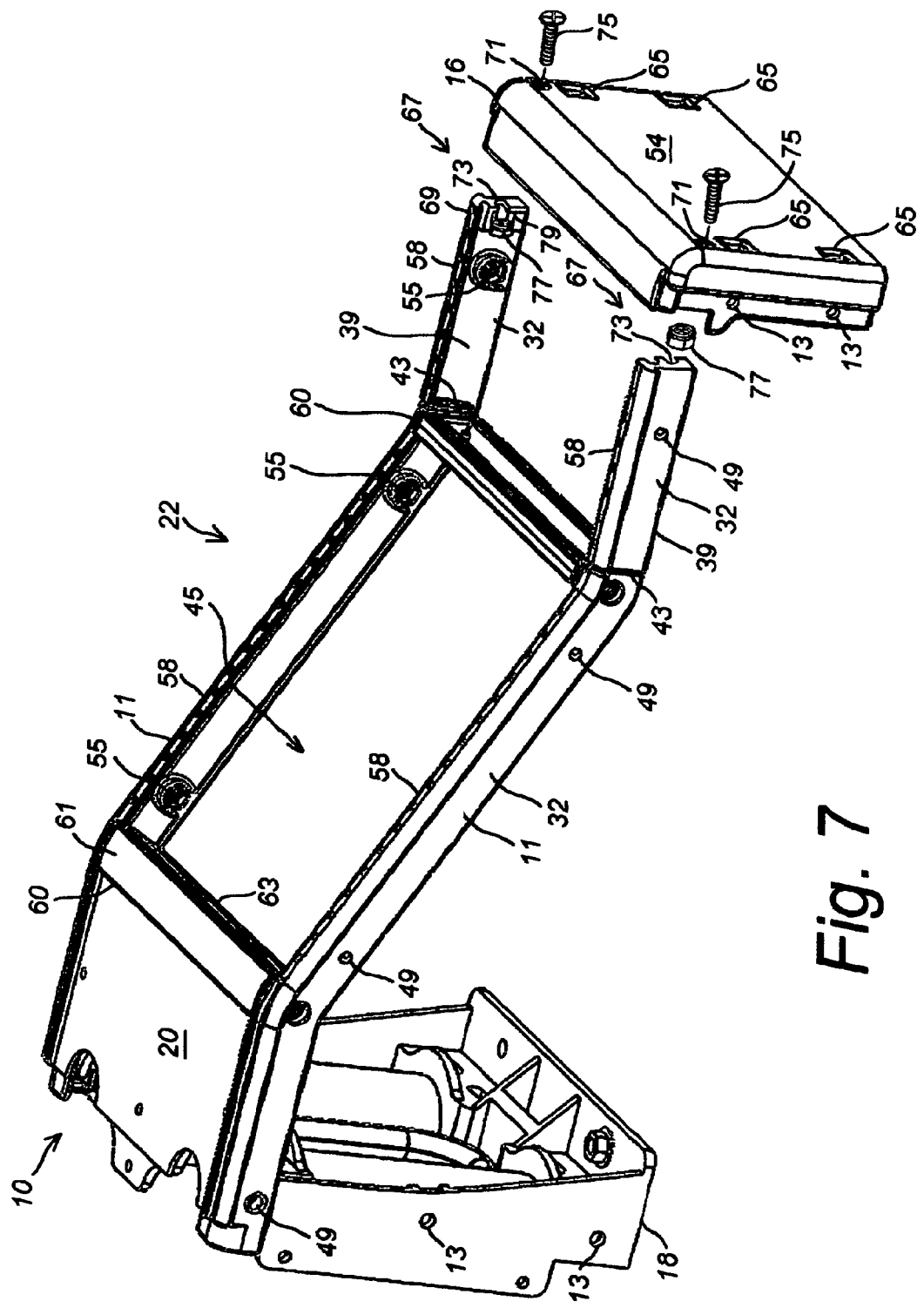
FIG. 7 is an assembly view of novel console, wherein side panels are removed for clarity.

FIG. 7 is an assembly view of novel console 10, wherein side panels 12 are removed for clarity. Side rails 11 are shortened from maximum length R1 to intermediate length R2. Fastener apertures 71, 73 are substantially aligned at cooperating connection points 67 between side rails 11 and end panel 16. End panel 16 is interconnected to end connection portions 69 of inner removable portion 39 of shortened side rails 11 by fasteners 75 coupled through fastener apertures 71, 73 at cooperating connection points 67 between side rails 11 and end panel 16.

Figure 8:
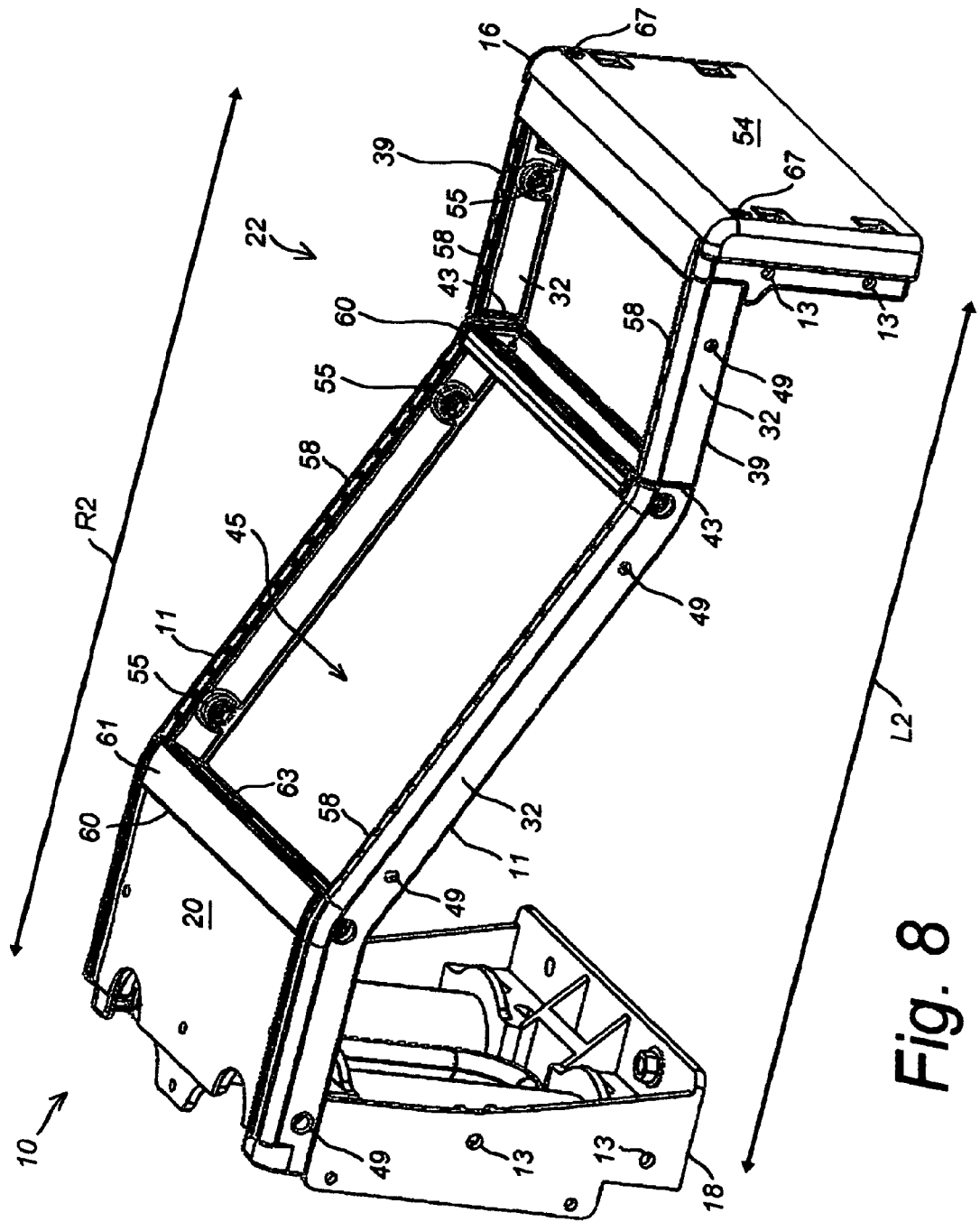
FIG. 8 is the assembled novel console, wherein side panels are removed for clarity.

FIG. 8 shows assembled novel console 10 having side panels 12 are removed for clarity. End panel 16 is interconnected to end connection portions 69 of inner removable portion 39 of shortened side rails 11 by means of fasteners 75 coupled through the fastener apertures 71, 73 at cooperating connection points 67 between side rails 11 and end panel 16. Accordingly, frame 19 of the console 10 is shortened to receive side panels 12 that are shortened from maximum length L1 to intermediate length L2.

Figure 9:
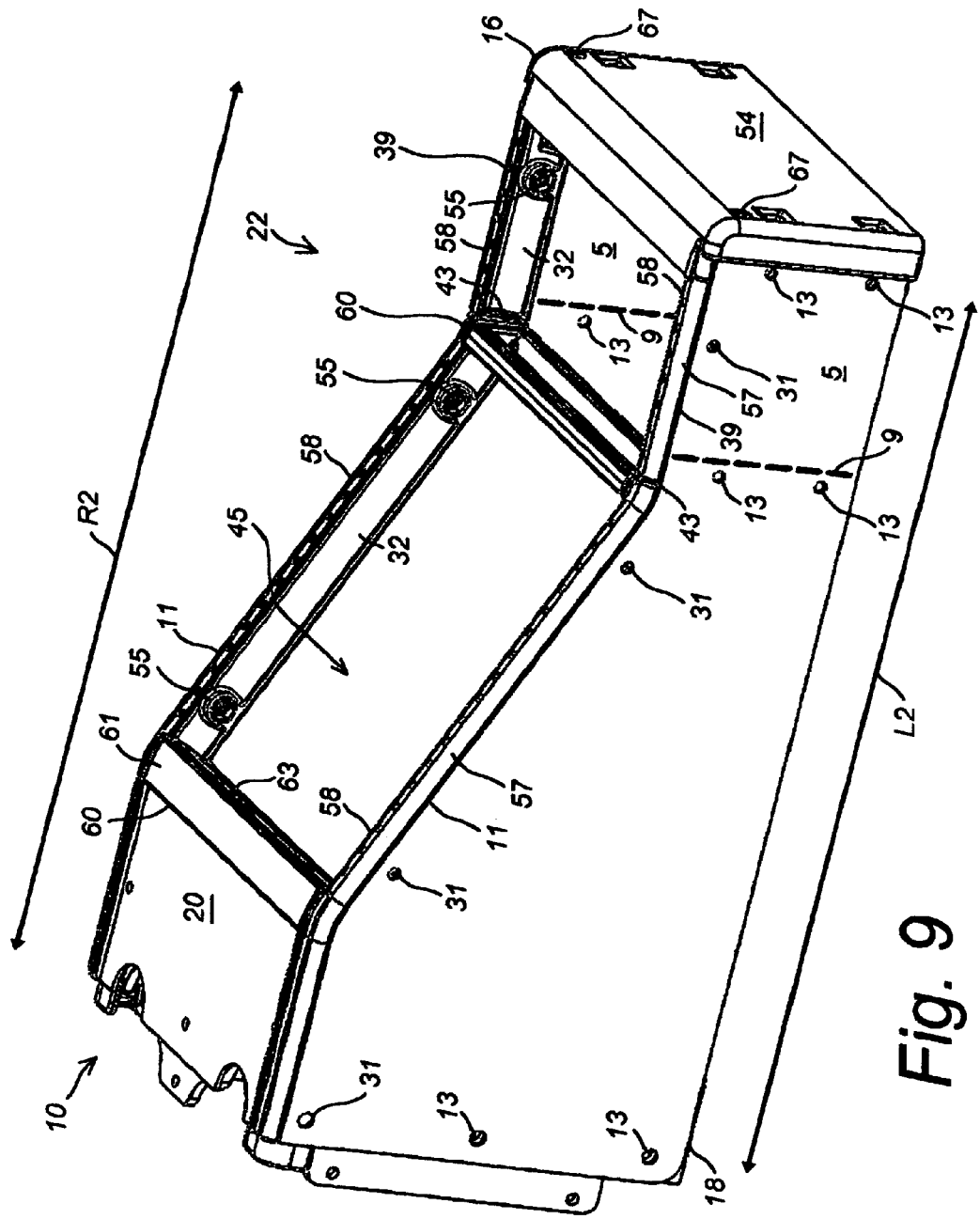
FIG. 9 shows a frame of the novel console assembled with side panels that are shortened from a maximum length to a shorter intermediate length.

FIG. 9 shows frame 19 of novel console 10 assembled with side panels 12 that are shortened from maximum length L1 to intermediate length L2. Here, end panel 16 is interconnected to end connection portions 12a of inner removable portion 5 of shortened side panels 12 by means of connectors 15 installed at cooperating connection points 13. Side rails 11 are shortened from maximum length R1 to intermediate length R2. Upper connection portions 33 of respective side panels 12 are interconnected to side panel connection portions 32 of side rails 11 at the plurality of cooperating connection points 31 there between. Frame 19 is now ready to receive face plates 20 at spaced apart mounting lips 58 of side rails 11.

Figure 10:
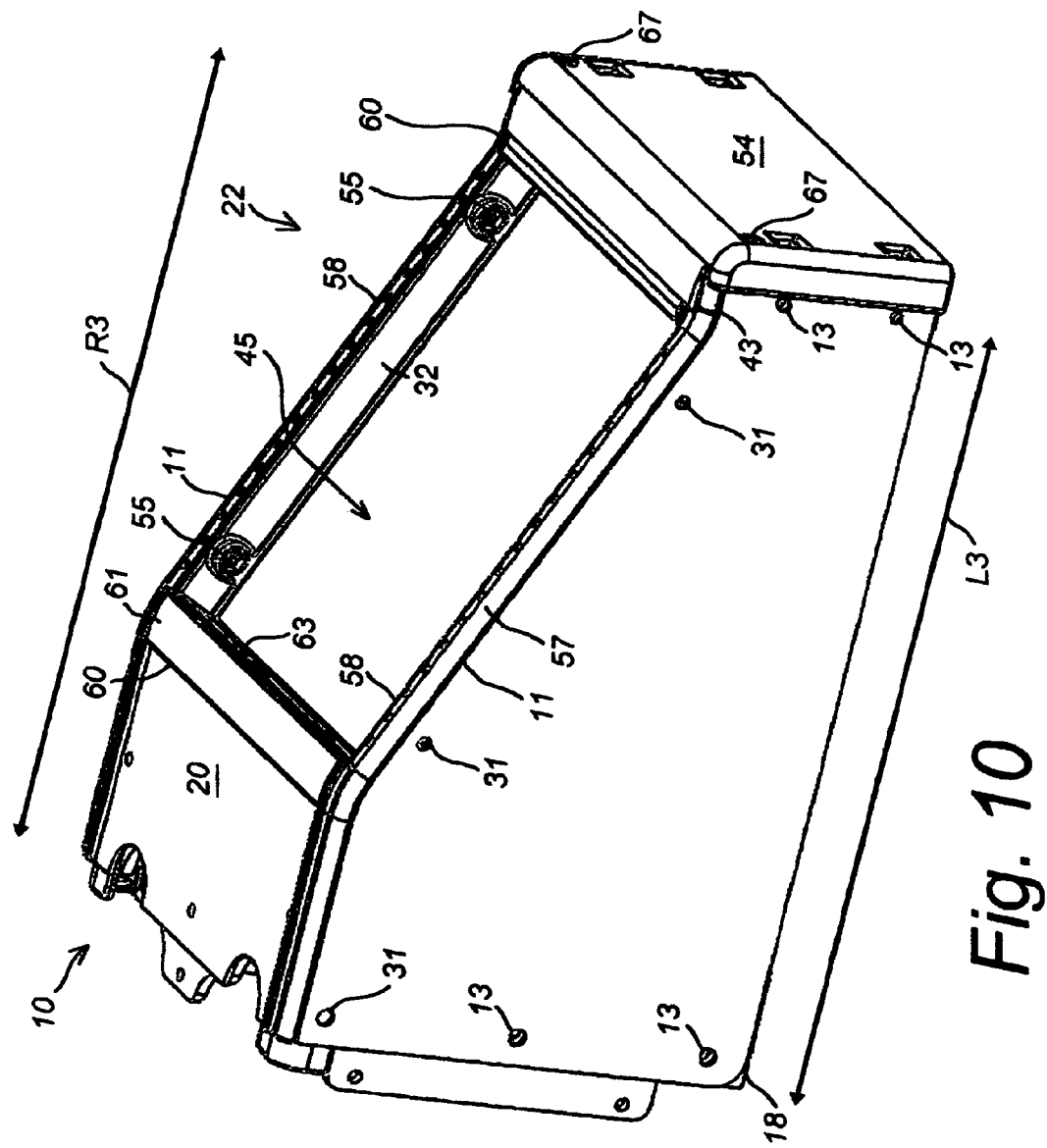
FIG. 10 shows a frame of the novel console assembled with side panels that are shortened from a maximum length to a still shorter minimum length.

FIG. 10 shows frame 19 of novel console 10 assembled with side panels 12 that are shortened from maximum length L1 to minimum length L3 which is shorter than intermediate length L2. End panel 16 is interconnected to end connection portions 12a of base side panel 12 by means of connectors 15 installed at cooperating connection points 13. Side rails 11 are shortened from maximum length R1 to minimum length R3. Upper connection portions 33 of respective side panels 12 are interconnected to side panel connection portions 32 of side rails 11 at the plurality of cooperating connection points 31 there between. Shortened frame 19 is now ready to receive face plates 20 at spaced apart mounting lips 58 of side rails 11.

Figure 11:
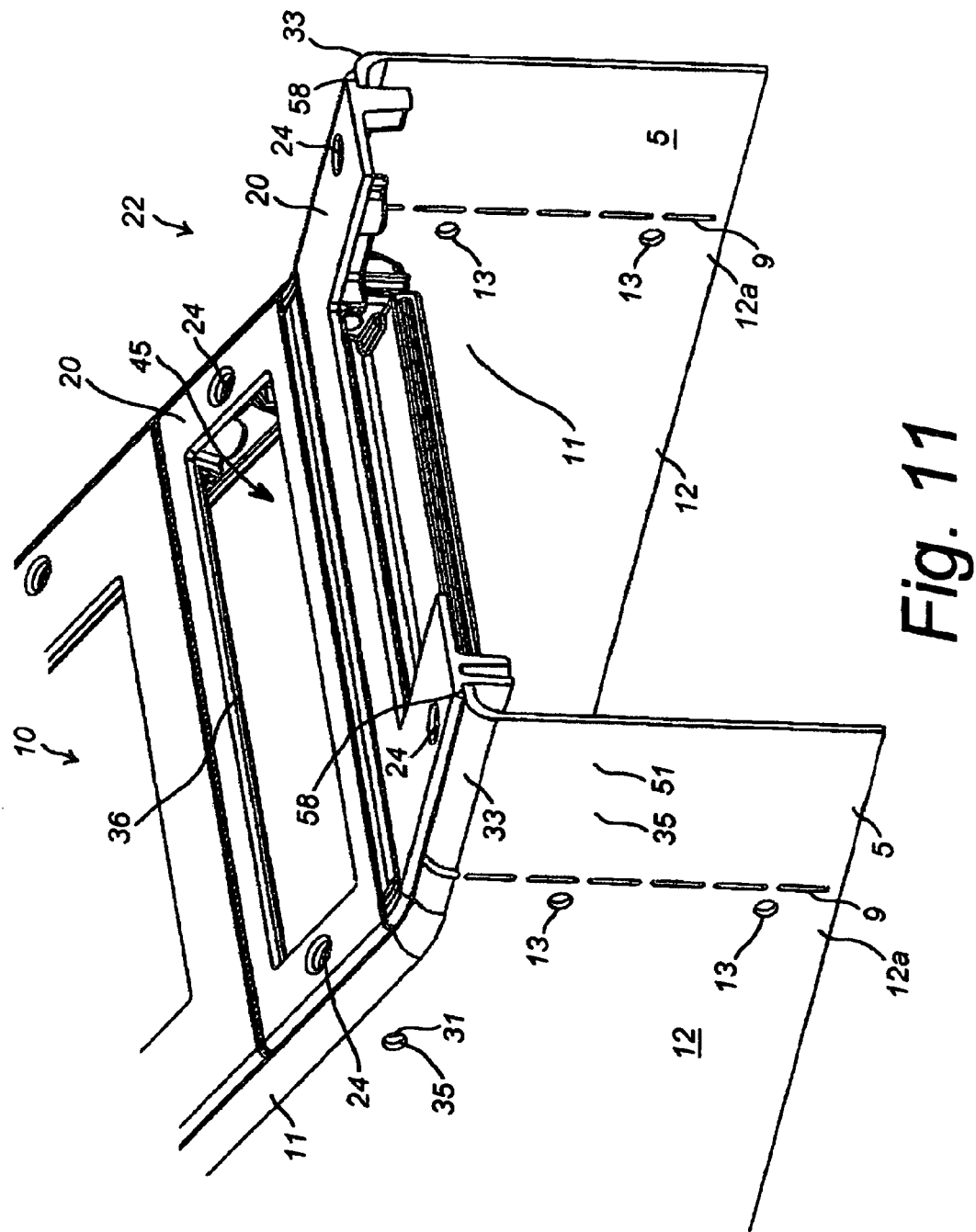
FIG. 11 illustrates one alternative embodiment of the novel console.

FIG. 11 illustrates one alternative embodiment wherein the pair of side rails 11 are optionally eliminated. Spaced apart mounting lips 58 are provided by upper connection portions 33 of respective side panels 12. For example, upper connection portions 33 are bent inwardly of the interior portion 45 of vehicle console 10, and face plates 20 are secured to mounting lips 58 of the side panel upper connection portions 33 by means of the releasable connectors 24.

Sizing elements 7, 9 are extended into upper connection portions 33 of respective side panels 12 for ease of removing respective removable portions 3, 5.

Method

Manufacturing the pair of shortenable side panels 12 having end connection portions 12a, 12b that are interconnectable with opposing edge mounting surfaces 16c, 18c of end panels 16, 18, wherein end connection portions 12a, 12b of side panels 12 and edge mounting surfaces 16c, 18c of end panels 16, 18 being formed with one or more cooperating connection points 13 by means of connectors 15. Side panels 12 are formed with a plurality of removable portions 3, 5 for shortening side panels 12 from the original maximum length L1 down to two or more shorter lengths L2, L3 . . . Ln. Side panels 12 further being molded with a plurality of sizing elements 7, 9 that correspond to removable portions 3, 5. Sizing elements 7, 9 at least are indicators of where side panels 12 can be cut or broken down to one of the other lengths L2 or L3 that are shorter than original maximum length L1. Each of base side panel 12 and removable portions 3, 5 all being formed with end connection portions 12a having connection points 13 at substantially identical positions that match with first end panel 16 for receiving connectors 15.

Molding the pair of shortenable side rails 11 of a molded material, such as plastic, nylon or composite material. Side rails 11 are molded with side panel connection portions 32 that correspond to upper connection portions 33 of respective side panel 12, wherein connection portions 32 of side rails 11 and upper portions 33 of side panels 12 are formed with one or more cooperating connection points 31 by means of connectors 35. Side rails 11 further are molded with the plurality of removable portions 37, 39 for shortening of side rails 11 from the original maximum length R1 down to two or more shorter lengths R2, R3 through Rn that correspond to shorter lengths L2, L3 . . . Ln of side panels 12. Side rails 11 further being molded with a plurality of sizing elements 41, 43 that correspond to the plurality of sizing elements 7, 9 of side panels 12. Sizing elements 41, 43 at least are indicators of where side rails 11 can be cut or broken down to one of the other lengths R2 or R3 that are shorter than original maximum length R1, else are molded stress risers that ease breaking of side rails 11 at one of the shorter lengths R2 or R3. According to one embodiment, molded sizing elements 41, 43 are molded grooves, cuts, notches or slots that narrow the cross-sectional area and weaken the side rails 11 at each of the shorter lengths R2 or R3.

Molding a plurality of face plates 20 of a molded material, such as plastic, nylon or composite material.

Interconnecting side panel connection portions 32 of molded side rails 11 with corresponding upper connection portions 33 of respective side panel 12 by means of connectors 35 at cooperating connection points 31.

Interconnecting first and second end connection portions 12a, 12b of respective side panels 12 between opposing side edge mounting surfaces 16c, 18c of respective end panels 16, 18 at corresponding connection points 13 by means of connectors 15, thereby forming a substantially rectangular support frame 19. Interconnecting end connection portions 69 of molded side rails 11 with end panels 16, 18 by means of connectors 75 at cooperating connection points 67, thereby forming a pair of spaced apart mounting lips 58 for face plates 20.

Securing a plurality of face plates 20 to spaced apart mounting lips 58 of side rails 11.

Disconnecting end panel 16 from side panels 12 and side rails 11 by removing connectors 15 and 35, respectively.

Shortening each side panel 12 to length L2 or L3 shorter than original length L1 by removal of one or more removable portions 3, 5 at sizing elements 7, 9. Shortening each side rail 11 to length R2 or R3 shorter than original length R1 to match length L2 or L3 of side panels 12 by removal of one or more removable portions 37, 39 at sizing elements 41, 43.

Interconnecting shortened side panels 12 with end panels 16, 18, including interconnecting first end connection portions 12a of base side panels 12 or retained inner removable portions 5 between opposing side edge mounting surfaces 16c of end panel 16 and second end connection portions 12b to second end panel 18 at corresponding connection points 13 by means of connectors 15, thereby forming a shortened support frame 19. Interconnecting shortened molded side rails 11 with end panels 16, 18, including interconnecting end connection portions 69 of molded side rails 11 with end panel 18 by means of connectors 75 at cooperating connection points 67, and interconnecting end connection portions 69 of base side rails 11 or retained inner removable portions 39 with end panel 16 by means of connectors 75 at cooperating connection points 67, thereby forming a pair of spaced apart mounting lips 58 for face plates 20.

Resecuring a lesser plurality of face plates 20 to spaced apart mounting lips 58 of side rails 11.

Therefore, the end user can remove the connectors 15, shorten side panels 12 of length L to a different length L2 or L3 that is different from the first length L1, and shorten side rails 11 of length R to a different length R2 or R3 that is different from the first length R1. The novel console 10 is now a different shorter length.

While the preferred and additional alternative embodiments of the invention have been illustrated and described, it will be appreciated that various changes can be made therein without departing from the spirit and scope of the invention.

Therefore, it will be appreciated that various changes can be made therein without departing from the spirit and scope of the invention. Accordingly, the inventor makes the following claims.

What is claimed is:

1. A variable length vehicle console, comprising:
   a pair of end panels;
   a pair of side panels interconnectable with the pair of end panels, each of the side panels further comprising at least one defined removable portion for reducing a length of the pair of side panels thereof to a reduced length greater than zero;
   a plurality of face plates each comprising portions thereof interconnectable with a respective one of the pair of side panels; and
   a plurality of connectors operable for securing each of the face plates to a respective portion of each of the side panels.

2. A variable length vehicle console, comprising:
   a pair of end panels;
   a pair of side panels interconnectable with the pair of end panels, each of the side panels further comprising at least one removable portion for reducing a length thereof to a reduced length, wherein each of the side panels further comprises a sizing element between a base portion thereof and the removable portion;
   a plurality of face plates each comprising portions thereof interconnectable with a respective one of the pair of side panels; and
   a plurality of connectors operable for securing each of the face plates to a respective portion of each of the side panels.

3. The console of claim 2 wherein the sizing element further comprises a stress riser.

4. The console of claim 3 wherein the stress riser further comprises a stress riser selected from the group of stress risers comprising: a scoring, a groove, a cut, a notch, and a slot.

5. The console of claim 4 wherein each of the base portion of each of the side panels and the removable portions thereof further comprises one or more connection points positioned to cooperate with connection points on the pair of end panels.

6. The console of claim 5 wherein each of the side panels further comprises a plurality of the removable portions for reducing a length thereof to a plurality of the reduced lengths; and
   wherein each of the plurality of the removable portions further comprises one or more of the connection points positioned to cooperate with the connection points on the pair of end panels.

7. The console of claim 6 wherein each of the base portions of the side panels and each of the plurality of the removable portions thereof further comprises a connection portion structured for having the interconnectable portions of the face plates interconnected therewith.

8. A variable length vehicle console, comprising:
   a console frame comprising:
      two opposing substantially rigid end panels, and
      two substantially rigid side panels interconnected between the two end panels, the side panels further comprising a base portion and at least one portion removable therefrom for reducing a length thereof to a reduced length with each of the base and removable portions further comprising respective upright wall portions terminating in spaced apart respective upper connection portions, and the upper connection portions extended substantially between the end panels;

a plurality of substantially rectangular removable face plates each comprising opposing side portions positioned to nest with the spaced apart upper connection portions of the side panels; and a plurality of connectors operable for securing the face plates to the respective upper connection portions of the side panels.

9. A variable length vehicle console, comprising:

a console frame comprising:

two opposing substantially rigid end panels, and two substantially rigid side panels interconnected between the two end panels, the side panels further comprising a base portion and at least one portion removable therefrom for reducing a length thereof to a reduced length with each of the base and removable portions further comprising respective upright wall portions terminating in spaced apart respective upper connection portions, and the upper connection portions extended substantially between the end panels, wherein each of the side panels further comprises a sizing element between the base and removable portions thereof;

a plurality of substantially rectangular removable face plates each comprising opposing side portions positioned to nest with the spaced apart upper connection portions of the side panels; and a plurality of connectors operable for securing the face plates to the respective upper connection portions of the side panels.

10. The console of claim 9 wherein the sizing element further comprises a stress riser.

11. The console of claim 10 wherein the stress riser further comprises a stress riser selected from the group consisting of: a scoring, a groove, a cut, a notch, and a slot.

12. The console of claim 11 wherein each of the side panels further comprises a plurality of removable portions for reducing a length thereof to a plurality of different reduced lengths, and further comprises one of the sizing elements between adjacent ones of the removable portions.

13. A variable length vehicle console, comprising:

two substantially rigid end panels each terminating in opposing recessed side mounting surfaces each formed with one or more connection points;

a pair of spaced apart substantially rigid side panels each comprising a base portion and at least one removable portion extended therefrom and removable therefrom for shortening the side panels from an original maximum length down to a shorter length, the base and removable portions each comprising an upright wall portion terminating in a connection portion adjacent to an upper portion thereof, a first end connection portions sized to fit within the recessed side mounting surfaces of a first one of the two end panels, the base portion further comprising a second end connection portion sized to fit within the recessed side mounting surfaces of a second one of the two end panels, and the first and second end connection portions each further comprising one or more connection points positioned to cooperate with the one or more connection points of the opposing side mounting surfaces of a different one of the first and second end panels;

a first plurality of connectors interconnecting the first end connection portions of one of the base and removable portions of the side panels to the opposing side edge mounting surfaces of the first end panel at the one or more cooperating connection points;

a second plurality of connectors interconnecting the second end connection portions of the base portions of the side panels to the opposing side edge mounting surfaces of the second end panel at the one or more cooperating connection points;

wherein the upper connection portions of the side panels are spaced apart a substantially constant distance by the end panels;

a plurality of substantially rectangular removable face plates each comprising opposing side portions positioned to nest with the spaced apart upper connection portions of the side panels; and a third plurality of connectors operable for securing the face plates to the upper connection portions of the side panels.

14. The console of claim 13 wherein the spaced apart upper connection portion of each of the side panels further comprises a mounting lip portion; and wherein the opposing side portions of the plurality of substantially rectangular removable face plates are further each positioned to nest with the mounting lip portions of the spaced apart upper connection portions of the side panels.

15. The console of claim 14 wherein each of the side panels further comprises a plurality of removable portions that are removable therefrom for shortening the side panels from the original maximum length down to one of a plurality of the shorter lengths.

16. The console of claim 15 wherein each of the side panels further comprises a plurality of sizing elements, one of the sizing elements being positioned between the base portion of each side panel and one of the removable portions and between adjacent removable portions, wherein the sizing elements further comprise stress risers structured for breaking the side panels at the removable portions.

17. A method of configuring a vehicle console having variable length, the method comprising:

providing first and second substantially rigid end panels;

providing a pair of side panels each comprising a base portion and at least one portion extended from the base portion and removable therefrom for reducing a length of the side panel to a reduced length, the base and removable portions each further comprising a first end connection portion thereof interconnectable with a first one of the pair of end panels, and the base portion further comprising a second end connection portion thereof interconnectable with a second one of the pair of end panels;

selecting a substantially identical length for each of the side panels;

interconnecting the first end connection portion of one of the base and removable portions to the first end panel;

interconnecting the second end connection portion of the base portions of the side panels with the second end panel;

providing a plurality of face plates each comprising portions thereof matable with each of the side panels;

mating the matable portions of the plurality of face plates with each of the side panels; and securing each of the face plates to each of the side panels.

18. The method of claim 17 wherein selecting a substantially identical length for each of the side panels further comprises selectively removing at least one of the removable portions of each of the side panels from the base portion thereof.

19. The method of claim 18 wherein providing a pair of side panels each comprising a base portion and at least one portion extended from the base portion and removable therefrom further comprises providing a plurality of sizing elements, one of the sizing elements being positioned between the base and removable portions of each side panel.

20. The method of claim 19 wherein providing a plurality of sizing elements positioned between the base and removable portions of each side panel further comprises providing a stress riser between the base and removable portions.

21. The method of claim 20 wherein providing a stress riser between the base and removable portions of each side panel further comprises selecting the stress riser from the group consisting of: a scoring, a groove, a series of grooves, a series of cuts, a series of notches, and a series of slots.

* * * * *